US012800705B2

(12) United States Patent
Rana

(10) Patent No.: US 12,800,705 B2
(45) Date of Patent: Nov. 17, 2026

(54) AUGMENTATION OF RADIO ALTIMETER FUNCTION USING MILLIMETER WAVE RADAR TO MITIGATE 5G SIGNAL INTERFERENCE IMPACT

(71) Applicant: Honeywell International Inc., Charlotte, NC (US)

(72) Inventor: Narayan Singh Rana, Bangalore (IN)

(73) Assignee: Honeywell Aerospace US LLC, Phoenix, AZ (US)

(*) Notice: Subject to any disclaimer, the term of this patent is extended or adjusted under 35 U.S.C. 154(b) by 186 days.

(21) Appl. No.: 18/929,279

(22) Filed: Oct. 28, 2024

(65) Prior Publication Data

US 2026/0079231 A1 Mar. 19, 2026

(30) Foreign Application Priority Data

Sep. 16, 2024 (IN) ............................. 202411069843

(51) Int. Cl.
*G01S 7/02* (2006.01)
*G01S 7/35* (2006.01)
*G01S 13/88* (2006.01)

(52) U.S. Cl.
CPC .............. *G01S 7/023* (2013.01); *G01S 7/354* (2013.01); *G01S 13/882* (2013.01)

(58) Field of Classification Search
CPC ........ G01S 7/023; G01S 13/882; G01S 7/354; G01S 13/08; G01C 5/06; G01C 5/005; G01C 5/02
See application file for complete search history.

(56) References Cited

U.S. PATENT DOCUMENTS 10,948,585 B1 3/2021 Billsberry et al.
2009/0289834 A1 11/2009 Devensky
(Continued)

FOREIGN PATENT DOCUMENTS

CN 201126477 Y 10/2008
CN 115184923 A 10/2022
CN 116087942 A 5/2023

OTHER PUBLICATIONS

R. Carty, "Advisory Circular," U.S. Department of Transportation Federal Aviation Administration, 2019. Accessed: Jun. 26, 2026. [Online]. Available https://www.faa.gov/documentLibrary/media/Advisory_Circular/AC_91-85B.pdf (Year: 2019).*
(Continued)

*Primary Examiner* — Olumide Ajibade Akonai
*Assistant Examiner* — Peter Davon Doze
(74) *Attorney, Agent, or Firm* — Fogg & Powers LLC

(57) ABSTRACT

A system comprises a RF antenna connected to a vehicle, a primary radio altimeter connected to the antenna, a secondary radio altimeter comprising a millimeter wave radar sensor, and a processor coupled to the primary and secondary radio altimeters. The processor determines whether an altitude detected by the primary radio altimeter is greater than a threshold altitude. If the altitude is greater than the threshold altitude, the altitude detected is used and signals from the secondary radio altimeter are discarded. If the altitude is not greater than the threshold altitude, the processor identifies whether signal interference from a cellular network source is present based on any abnormal signals from the primary radio altimeter. If abnormal signals are not present, altitude estimates detected by the primary and secondary radio altimeters are correlated. If abnormal signals are present, signals from the secondary radio altimeter are processed to detect a vehicle altitude.

20 Claims, 5 Drawing Sheets

(56) References Cited

U.S. PATENT DOCUMENTS

| | | | |
|---|---|---|---|
| 2019/0342842 | A1 | 11/2019 | Stephens et al. |
| 2022/0294504 | A1* | 9/2022 | Chaves ................ H04B 7/0465 |
| 2023/0393235 | A1 | 12/2023 | Frick et al. |
| 2024/0083592 | A1 | 3/2024 | Ricaud et al. |

OTHER PUBLICATIONS

European Patent Office, "Extended European Search Report", dated Jan. 23, 2026, from EP Application No. 25197611.4, from Foreign Counterpart to U.S. Appl. No. 18/929,279, pp. 1 through 10, Published: EP.

* cited by examiner

AUGMENTATION OF RADIO ALTIMETER FUNCTION USING MILLIMETER WAVE RADAR TO MITIGATE 5G SIGNAL INTERFERENCE IMPACT

CROSS-REFERENCE TO RELATED APPLICATION

This application claims priority to Indian Provisional Patent Application No. 202411069843 filed on Sep. 16, 2024, the contents of which are incorporated herein by reference in their entirety.

BACKGROUND

Conventional methods to mitigate 5G interference with radio altimeters operating at 4.2 GHz to 4.5 GHz include the use of radio frequency (RF) front-end filters. The limitation with this technique is that it suppresses only out of band 5G noise, but cannot suppress spurious signals leaked into the radio altimeter band due to 5G interference. Thus, RF filtering is not a solution for in-band noise. Also, the frequency separation between the 5G band and the radio altimeter band is going to further narrow, resulting in reduced filter efficiency.

In addition, as the impact of 5G interference increases with a decrease in aircraft altitude, there is a likelihood that radio altimeter operation will be highly impacted by 5G interference, even with the use of a RF front-end filter.

SUMMARY

A system comprises a radio frequency (RF) antenna connected to a vehicle; a primary radio altimeter onboard the vehicle and operatively connected to the RF antenna; a secondary radio altimeter comprising a millimeter wave radar sensor onboard the vehicle; and a processor operatively coupled to the primary radio altimeter and the secondary radio altimeter. The processor hosts at least one application module that is operative to determine whether an estimated altitude of the vehicle detected by the primary radio altimeter is greater than a predetermined threshold altitude. In response to determining that the estimated altitude of the vehicle is greater than the predetermined threshold altitude, the estimated altitude detected by the primary radio altimeter is used, and signals from the secondary radio altimeter are discarded. In response to determining that the estimated altitude of the vehicle is not greater than the predetermined threshold altitude, the application module identifies whether signal interference from a cellular network source is present based on any abnormal input signals from the primary radio altimeter. If abnormal input signals from the primary radio altimeter are not present, altitude estimates of the vehicle detected by the primary radio altimeter and the secondary radio altimeter are correlated, and a correction factor is applied to the correlated altitude estimates as needed. If abnormal input signals from the primary radio altimeter are present, signals from the secondary radio altimeter are processed to detect an estimated altitude of the vehicle.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for augmentation of a radio altimeter function to mitigate against interference of next generation cellular network signals, such as 5G signals, are described herein. In the present approach, a millimeter (mm) wave radar is used in a secondary radio altimeter to augment the functionality of a primary radio altimeter at lower altitudes without impacting the operation of the primary radio altimeter.

Further details of various embodiments are described hereafter and with reference to the drawings.

Figure 1:
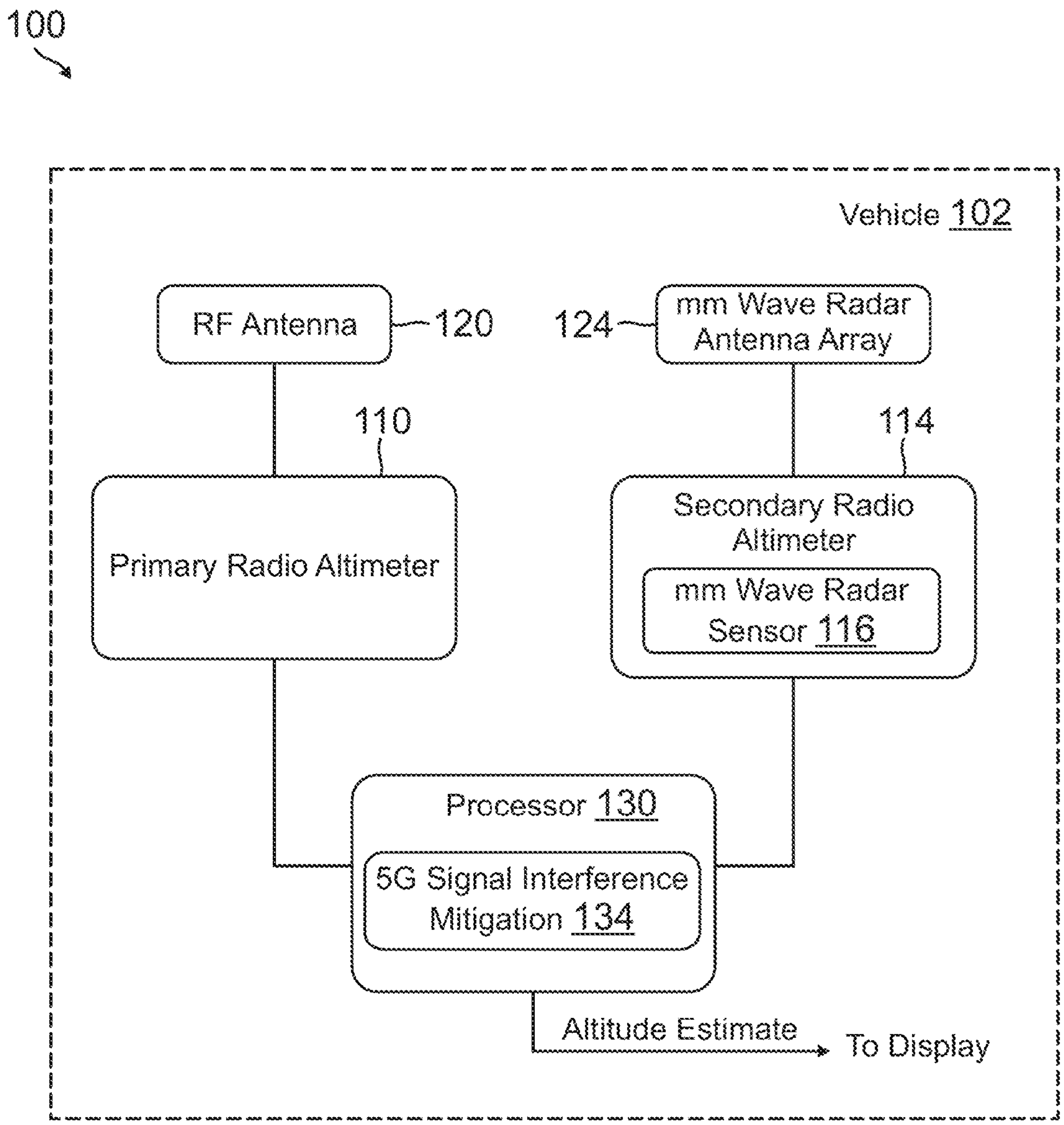
FIG. 1 is a block diagram of a system for augmentation of a radio altimeter function on a vehicle to mitigate against interference from next generation cellular signals, according to one embodiment.

FIG. 1 is a block diagram of a system 100 for augmentation of a radio altimeter function on a vehicle 102 such as an aircraft, to mitigate against interference from next generation cellular signals such as 5G signals, according to one embodiment. The system 100 comprises a primary radio altimeter 110 onboard vehicle 102, and a secondary radio altimeter 114 onboard vehicle 102. The secondary radio altimeter 114 includes a mm wave radar sensor 116. An RF antenna 120 is mounted on vehicle 102 and is operatively coupled with primary radio altimeter 110. A mm wave radar antenna array 124 is operatively coupled with mm wave radar sensor 116. In an alternative embodiment, the mm wave radar antenna array 124 can be embedded in RF antenna 120.

A processor 130 is in operative communication with primary radio altimeter 110 and secondary radio altimeter 114. The processor 130 hosts an application module 134 that is operative to provide 5G signal interference mitigation, as described further hereafter. In an alternative embodiment, processor 130 can reside in primary radio altimeter 110.

During operation of system 100, ground reflected signals are received in primary radio altimeter 110 through RF antenna 120. A determination is made whether an estimated altitude of vehicle 102 detected by primary radio altimeter 110 is greater than a predetermined threshold altitude. If the estimated altitude of vehicle 102 is greater than the predetermined threshold altitude, then only the estimated altitude detected by primary radio altimeter 110 is used for vehicle 102, and signals from the secondary radio altimeter 114 are discarded.

If the estimated altitude of vehicle 102 is not greater than the predetermined threshold altitude, then method identifies whether signal interference from a 5G source is present, based on any abnormal input signals from primary radio altimeter 110. If abnormal input signals from primary radio altimeter 110 are not present, then method correlates altitude estimates of vehicle 102 detected by the primary radio altimeter 110 and the secondary radio altimeter 114, and applies a correction factor to the correlated altitude estimates if needed. If abnormal input signals from the primary radio altimeter 110 are detected, then only input signals from secondary radio altimeter 114 are processed to detect the estimated altitude of vehicle 102. The system 100 can then send a final altitude estimate to a display system for vehicle 102.

In determining whether there are abnormal signals from the primary radio altimeter, various conditions can be considered. For example, when an aircraft is ascending or descending, the algorithm in the primary radio altimeter knows the nominal ascending or descending rate of an aircraft and any expected variation in altitude, which are considered deterministic conditions. For instance, normally there would be gradual altitude changes during ascent or descent of the aircraft. When an interference signal occurs such as from a 5G source, the deterministic conditions become indeterministic. In this case, a sudden fluctuation in altitude readings can occur from a spike or jump in the altitude data, which would result in an abnormal reading.

Figure 2:
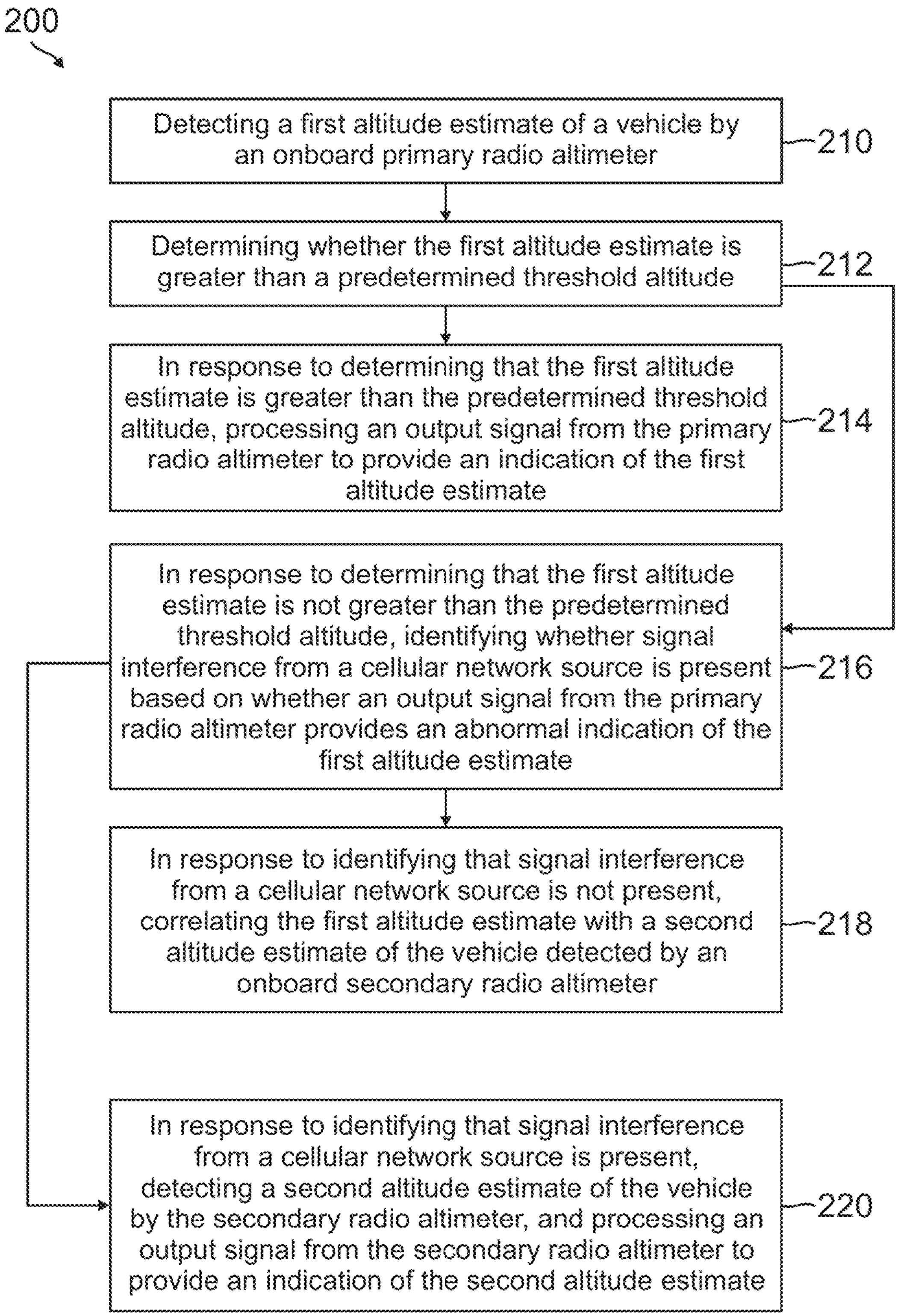
FIG. 2 is a flow diagram of a method for augmenting altitude estimation of a vehicle, according to an example implementation.

FIG. 2 is a flow diagram of a method 200 for augmenting altitude estimation of a vehicle such as an aircraft, according to an example implementation. The method 200 includes detecting a first altitude estimate of a vehicle by an onboard primary radio altimeter (block 210); and determining whether the first altitude estimate is greater than a predetermined threshold altitude (block 212). In response to determining that the first altitude estimate is greater than the predetermined threshold altitude, method 200 processes an output signal from the primary radio altimeter to provide an indication of the first altitude estimate (block 214).

In response to determining that the first altitude estimate is not greater than the predetermined threshold altitude, method 200 identifies whether signal interference from a cellular network source, such as a 5G source, is present based on whether an output signal from the primary radio altimeter provides an abnormal indication of the first altitude estimate (block 216). In response to identifying that signal interference from a cellular network source is not present, method 200 correlates the first altitude estimate with a second altitude estimate of the vehicle detected by an onboard secondary radio altimeter, such as a mm wave radar (block 218). A correction factor can be applied to the correlated first and second altitude estimates as needed. In response to identifying that signal interference from a cellular network source is present, method 200 detects a second altitude estimate of the vehicle by the secondary radio altimeter, and processes an output signal from the secondary radio altimeter to provide an indication of the second altitude estimate (block 220). The method 200 can then send a final altitude estimate to a display system for the vehicle.

Figure 3:
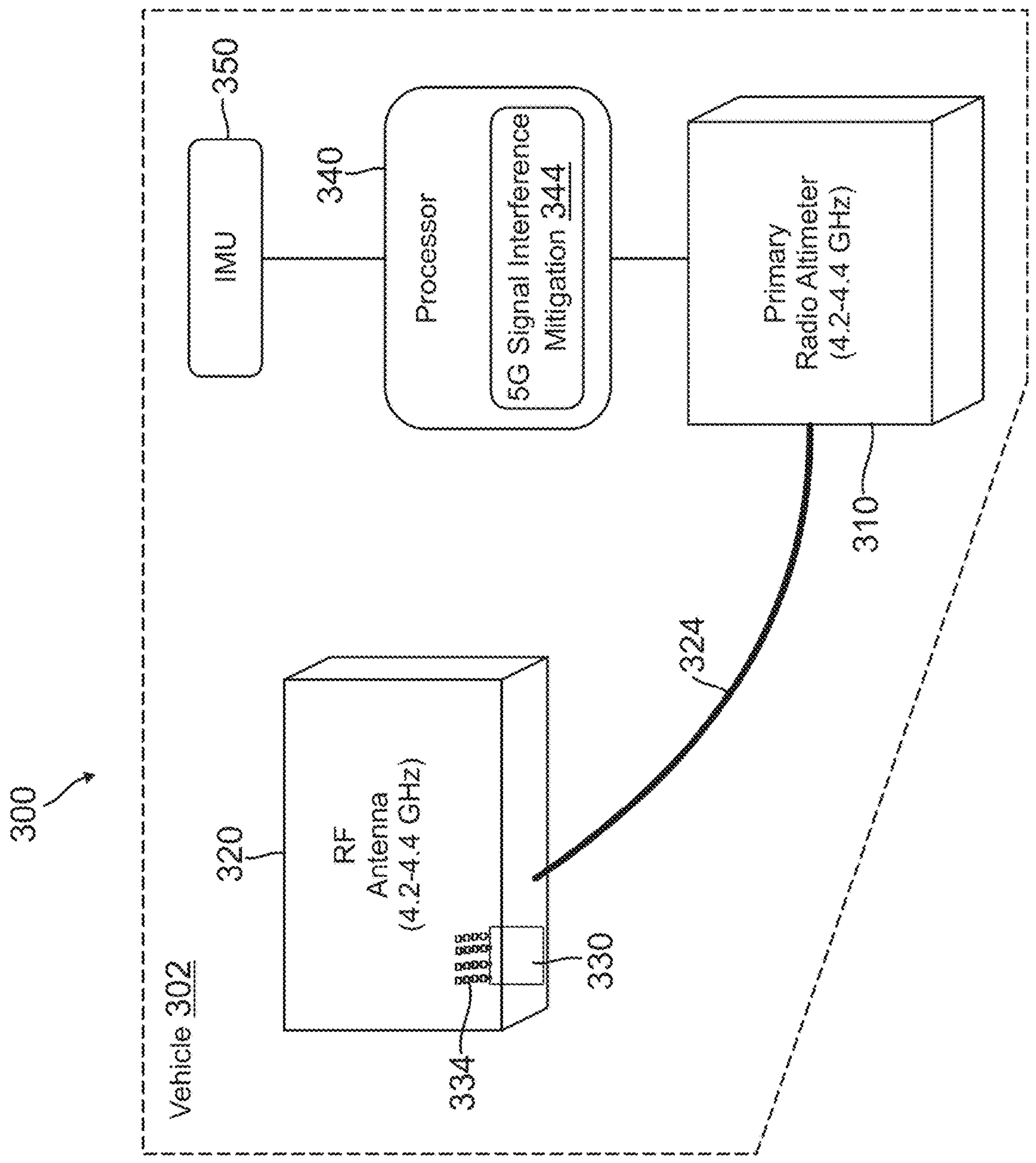
FIG. 3 is a block diagram of a system for augmentation of a radio altimeter function on a vehicle, to mitigate against interference of 5G signals, according to another embodiment.

FIG. 3 is a block diagram of a system 300 for augmentation of a radio altimeter function on a vehicle 302, such as an aircraft, to mitigate against interference of 5G signals, according to another embodiment. The system 300 comprises a primary radio altimeter 310 onboard vehicle 302, and an RF antenna 320 mounted on vehicle 302. The primary radio altimeter 310 is operatively connected to RF antenna 320, such as through a connecting RF cable 324. In one embodiment, primary radio altimeter 310 and RF antenna 320 are configured to operate in a frequency range of about 4.2 GHz to about 4.4 GHz, with RF cable 324 configured to carry a 4.2-4.4 GHz signal. In one embodiment, primary radio altimeter 310 can be a frequency-modulated continuous-wave (FMCW) chirp radar sensor. The RF antenna 320 can be a flat panel antenna such as a patch antenna. In one example, RF antenna 320 is a flat panel printed antenna working at primary radio altimeter frequency. The RF antenna 320 can also have printed antenna arrays configured to work as beam steering antenna elements at mm wave frequency.

A secondary radio altimeter in the form of a mm wave radar sensor 330 is coupled to RF antenna 320. The mm wave radar sensor 330 is sized so it can be housed within RF antenna 320. In one embodiment, the mm wave radar sensor 330 can be implemented in a small outline integrated circuit (SOIC) sensor chip and includes an antenna array 334. The sensor chip can be mounted on a backside of a printed circuit board for RF antenna 320 that can feed antenna array 334 with slot/aperture feeding mechanism. In one example, mm wave radar sensor 330 can be a low power mm wave frequency-modulated continuous-wave (FMCW) chirp radar sensor that is embedded in RF antenna 320 as an augmentation source. The feeding mechanism for antenna array 334 can be enabled whenever an altitude of vehicle 302 decreases below a threshold altitude (e.g., about 300 meters).

The antenna array 334 can be very small in size and can be printed within or around RF antenna 320, as shown in FIG. 3, with a feed connected to the sensor chip. The RF cable 324 is configured to transmit and receive a low frequency control signal, such as an amplitude shift keying (ASK) control signal, and can provide electric power from a power supply, such as a 3.3V DC supply, to mm wave radar sensor 330. Thus, no extra power supply line is needed.

In one example, mm wave radar sensor 330 can operate in a frequency range of about 76 GHz to about 84 GHz when implemented as the secondary radio altimeter for an aircraft. The use of a frequency sub-band within 76 GHz to 84 GHz varies in different countries, but can be managed through data link, such that the mm wave radar can be configured for the approved frequency bands in different countries.

A processor 340 is in operative communication with primary radio altimeter 310 and with mm wave radar sensor 330 through RF cable 324 via primary radio altimeter 310. The processor 340 hosts an application module 344 that is operative to provide 5G signal interference mitigation, as described below with respect to FIG. 4. In one embodiment, an onboard inertial measurement unit (IMU) 350 is operative to produce inertial measurements for vehicle 302, and is in operative communication with processor 340. In an alternative embodiment, processor 340 can reside in primary radio altimeter 310.

The mm wave radar sensor 330 can be configured to estimate a range, a direction of arrival, and can also accommodate for Doppler shift. The direction of arrival feature in combination with IMU 350 can aid in estimating altitude more accurately. The mm wave radar sensor 330 can also provide a variable beam width, which can be utilized to further improve the altitude accuracy.

In one embodiment, primary radio altimeter 310 resides in a line replaceable unit (LRU), which is located in an electronic bay of a cockpit of an aircraft, and RF antenna 320 is a patch antenna. The patch antenna can be mounted on the skin of the aircraft, and mm wave radar sensor 330 is embedded in the patch antenna.

Figure 4:
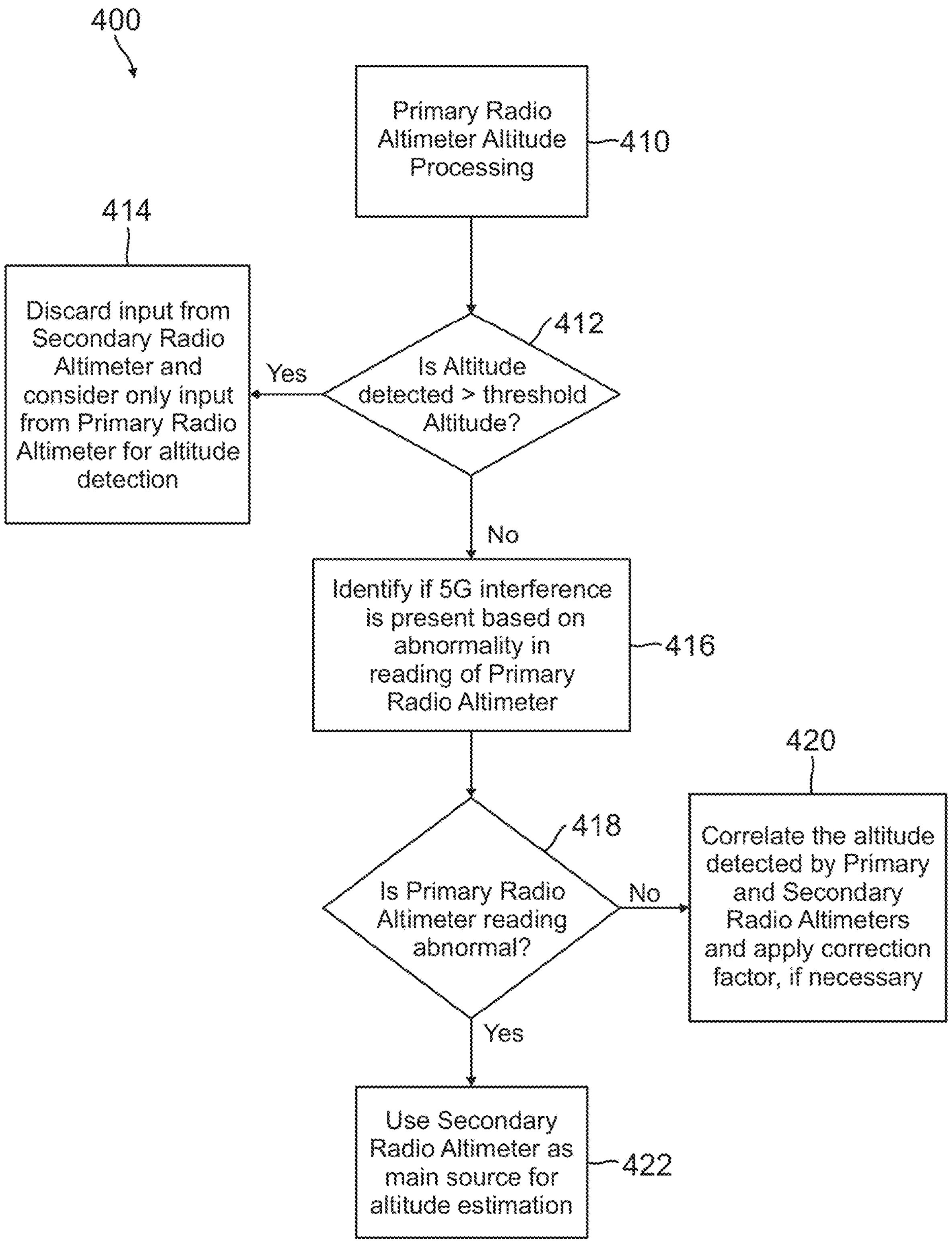
FIG. 4 is a flow diagram of an example method for providing 5G signal interference mitigation, which can be implemented by the system of FIG. 3.

FIG. 4 is a flow diagram of a method 400 for providing 5G signal interference mitigation, such as can be performed by application module 344 for vehicle 302 (FIG. 3), according to an example implementation. Initially, method 400 carries out primary radio altimeter altitude processing (block 410) during vehicle operation. The method 400 determines whether an estimated altitude detected by the primary radio altimeter (e.g., primary radio altimeter 310) is greater than a threshold altitude (e.g., 300 m) (block 412). If yes, method 400 discards any input from a secondary radio altimeter (e.g., mm wave radar sensor 330), and considers only the input from the primary radio altimeter for altitude detection (block 414).

If the estimated altitude detected by the primary radio altimeter is not greater than the threshold altitude, then method 400 identifies whether 5G signal interference is present based on an abnormality in the reading of the primary radio altimeter (block 416). If the determination is made that primary radio altimeter reading is not abnormal (block 418), then method 400 correlates the estimated altitude detected by the primary radio altimeter and the secondary radio altimeter, and applies a correction factor if necessary (block 420). If the determination is made that the primary radio altimeter reading is abnormal (at block 418), then method 400 uses the secondary radio altimeter as the main source for altitude estimation (block 422).

Figure 5:
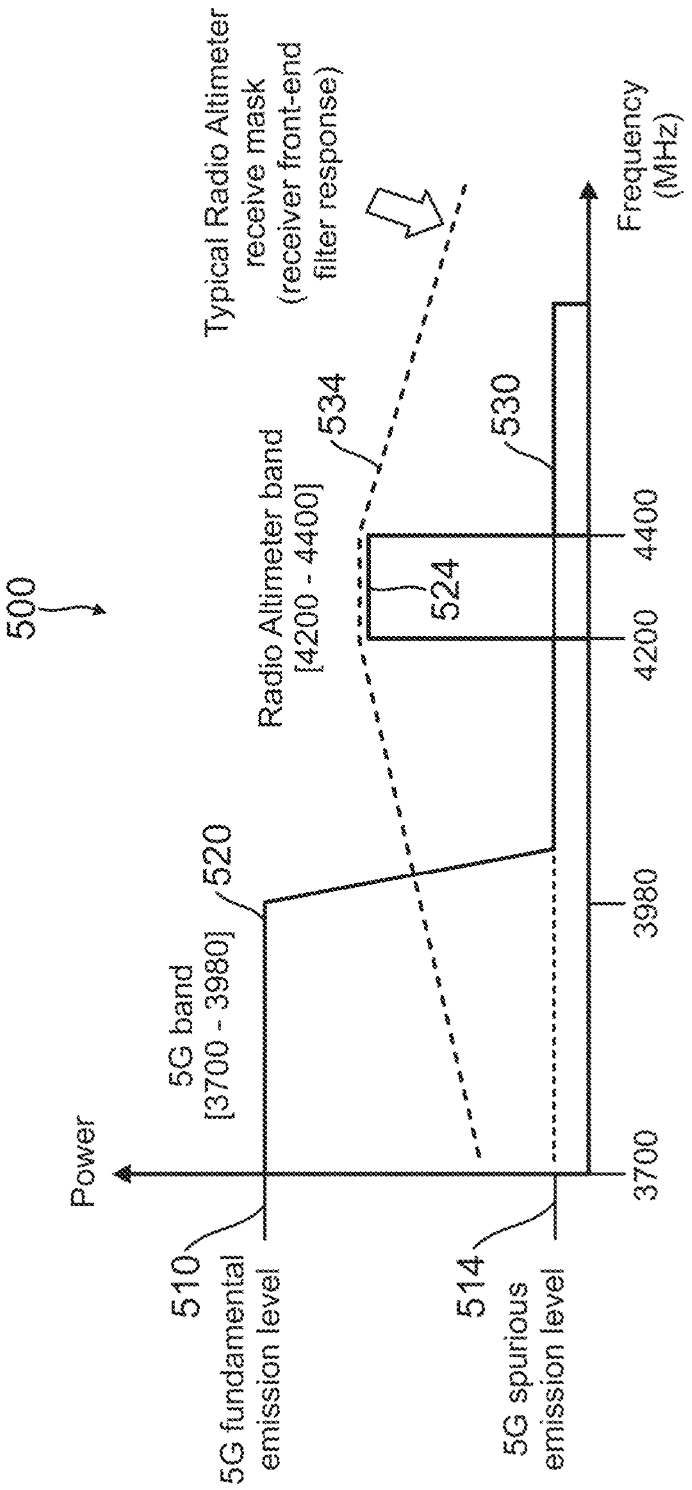
FIG. 5 is a graphical representation of an example interference profile of 5G signals with spectral noise.

FIG. 5 is a graphical representation 500 of an interference profile of 5G signals with spectral noise, showing a power level with respect to frequency. A 5G fundamental emission power level is shown at 510 and a 5G spurious emission power level (spectral noise) is shown at 514. The 5G band has an operating frequency band 520 of 3700 to 3980 MHz, while a radio altimeter has an operating frequency band 524 of 4200 to 4400 MHz. As shown in FIG. 5, the spectral noise of the 5G signals leaks into the operating frequency band of the radio altimeter, as shown at 530.

A typical radar altimeter receive mask has a receiver front-end filter response 534, but does not block the spectral noise of the 5G signals. As a mm wave radar can operate at 7600 MHz to 8400 MHz, it is not subject to 5G spectral noise and can thus be usefully implemented as a secondary radio altimeter for an aircraft, as described herein.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system comprising: a radio frequency (RF) antenna connected to a vehicle; a primary radio altimeter onboard the vehicle and operatively connected to the RF antenna; a secondary radio altimeter comprising a millimeter wave radar sensor onboard the vehicle; and a processor operatively coupled to the primary radio altimeter and the secondary radio altimeter, wherein the processor hosts at least one application module that is operative to: determine whether an estimated altitude of the vehicle detected by the primary radio altimeter is greater than a predetermined threshold altitude; in response to determining that the estimated altitude of the vehicle is greater than the predetermined threshold altitude, using the estimated altitude detected by the primary radio altimeter, and discarding signals from the secondary radio altimeter; in response to determining that the estimated altitude of the vehicle is not greater than the predetermined threshold altitude, identifying whether signal interference from a cellular network source is present based on any abnormal input signals from the primary radio altimeter; wherein if abnormal input signals from the primary radio altimeter are not present, correlating altitude estimates of the vehicle detected by the primary radio altimeter and the secondary radio altimeter, and applying a correction factor to the correlated altitude estimates as needed; wherein if abnormal input signals from the primary radio altimeter are present, processing signals from the secondary radio altimeter to detect an estimated altitude of the vehicle.

Example 2 includes the system of Example 1, wherein the millimeter wave radar sensor includes an antenna array operating at a millimeter wave frequency, and is housed in the RF antenna.

Example 3 includes the system of Example 2, wherein the primary radio altimeter is operatively connected to the RF antenna through a RF cable.

Example 4 includes the system of Example 3, wherein the RF cable is configured to transmit and receive a control signal, and provides electric power to the millimeter wave radar sensor.

Example 5 includes the system of any of Examples 2-4, wherein a feed for the antenna array is enabled when an altitude of the vehicle is below the predetermined threshold altitude.

Example 6 includes the system of any of Examples 1-5, wherein the primary radio altimeter and the RF antenna are configured to operate in a frequency range of about 4.2 GHz to about 4.4 GHz.

Example 7 includes the system of Example 6, wherein the millimeter wave radar sensor is configured to operate in a frequency range of about 76 GHz to about 84 GHz.

Example 8 includes the system of any of Examples 1-7, wherein the millimeter wave radar sensor comprises a small outline integrated circuit (SOIC) chip and an antenna array.

Example 9 includes the system of Example 8, wherein the SOIC chip and the antenna array are embedded in the RF antenna.

Example 10 includes the system of any of Examples 1-9, wherein the millimeter wave radar sensor comprises a millimeter wave frequency-modulated continuous-wave (FMCW) chirp radar sensor.

Example 11 includes the system of any of Examples 1-10, wherein the vehicle comprises an aircraft.

Example 12 includes the system of any of Examples 1-11, wherein the at least one application module is operative to mitigate interference from next generation cellular signals including 5G signals.

Example 13 includes a method for augmenting altitude estimation, the method comprising: detecting a first altitude estimate of a vehicle by an onboard primary radio altimeter operatively connected to a radio frequency (RF) antenna; determining whether the first altitude estimate is greater than a predetermined threshold altitude; in response to determining that the first altitude estimate is greater than the predetermined threshold altitude, processing a signal from the primary radio altimeter to provide an indication of the first altitude estimate; in response to determining that the first altitude estimate is not greater than the predetermined threshold altitude, identifying whether signal interference from a cellular network source is present based on whether a signal from the primary radio altimeter provides an abnormal indication of the first altitude estimate; in response to identifying that signal interference from a cellular network source is not present, correlating the first altitude estimate with a second altitude estimate of the vehicle detected by an onboard secondary radio altimeter that includes a millimeter wave radar sensor; and in response to identifying that signal interference from a cellular network source is present, detecting a second altitude estimate of the vehicle by the secondary radio altimeter, and processing a signal from the secondary radio altimeter to provide an indication of the second altitude estimate.

Example 14 includes the method of Example 13, further comprising: applying a correction factor to the correlated first and second altitude estimates; and processing the correlated first and second altitude estimates to provide an indication of a final altitude estimate.

Example 15 includes the method of any of Examples 13-14, further comprising: sending a final altitude estimate to a display system for the vehicle.

Example 16 includes the method of any of Examples 13-15, wherein the millimeter wave radar sensor includes an antenna array operating at a millimeter wave frequency, and is housed in the RF antenna.

Example 17 includes the method of Example 16, wherein a feed for the antenna array is enabled when the first altitude estimate of the vehicle is not greater than the predetermined threshold altitude.

Example 18 includes the method of any of Examples 13-17, wherein: the primary radio altimeter and the RF antenna operate in a frequency range of about 4.2 GHz to about 4.4 GHz; and the millimeter wave radar sensor is configured to operate in a frequency range of about 76 GHz to about 84 GHz.

Example 19 includes the method of any of Examples 13-18, wherein the vehicle comprises an aircraft.

Example 20 includes the method of any of Examples 13-19, wherein the cellular network source produces next generation cellular signals including 5G signals.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:

a radio frequency (RF) antenna connected to a vehicle;

a primary radio altimeter onboard the vehicle and operatively connected to the RF antenna;

a secondary radio altimeter comprising a millimeter wave radar sensor onboard the vehicle; and a processor operatively coupled to the primary radio altimeter and the secondary radio altimeter, wherein the processor hosts at least one application module that is operative to:

determine whether an estimated altitude of the vehicle detected by the primary radio altimeter is greater than a predetermined threshold altitude;

in response to determining that the estimated altitude of the vehicle is greater than the predetermined threshold altitude, using the estimated altitude detected by the primary radio altimeter, and discarding signals from the secondary radio altimeter;

in response to determining that the estimated altitude of the vehicle is not greater than the predetermined threshold altitude, identifying whether signal interference from a cellular network source is present based on any abnormal input signals from the primary radio altimeter;

wherein if abnormal input signals from the primary radio altimeter are not present, correlating altitude estimates of the vehicle detected by the primary radio altimeter and the secondary radio altimeter, and applying a correction factor to the correlated altitude estimates as needed;

wherein if abnormal input signals from the primary radio altimeter are present, processing signals from the secondary radio altimeter to detect an estimated altitude of the vehicle.

2. The system of claim 1, wherein the millimeter wave radar sensor includes an antenna array operating at a millimeter wave frequency, and is housed in the RF antenna.

3. The system of claim 2, wherein the primary radio altimeter is operatively connected to the RF antenna through a RF cable.

4. The system of claim 3, wherein the RF cable is configured to transmit and receive a control signal, and provides electric power to the millimeter wave radar sensor.

5. The system of claim 2, wherein a feed for the antenna array is enabled when an altitude of the vehicle is below the predetermined threshold altitude.

6. The system of claim 1, wherein the primary radio altimeter and the RF antenna are configured to operate in a frequency range of about 4.2 GHz to about 4.4 GHz.

7. The system of claim 6, wherein the millimeter wave radar sensor is configured to operate in a frequency range of about 76 GHz to about 84 GHz.

8. The system of claim 1, wherein the millimeter wave radar sensor comprises a small outline integrated circuit (SOIC) chip and an antenna array.

9. The system of claim 8, wherein the SOIC chip and the antenna array are embedded in the RF antenna.

10. The system of claim 1, wherein the millimeter wave radar sensor comprises a millimeter wave frequency-modulated continuous-wave (FMCW) chirp radar sensor.

11. The system of claim 1, wherein the vehicle comprises an aircraft.

12. The system of claim 1, wherein the at least one application module is operative to mitigate interference from next generation cellular signals including 5G signals.

13. A method for augmenting altitude estimation, the method comprising:

detecting a first altitude estimate of a vehicle by an onboard primary radio altimeter operatively connected to a radio frequency (RF) antenna;

determining whether the first altitude estimate is greater than a predetermined threshold altitude;

in response to determining that the first altitude estimate is greater than the predetermined threshold altitude, processing a signal from the primary radio altimeter to provide an indication of the first altitude estimate;

in response to determining that the first altitude estimate is not greater than the predetermined threshold altitude, identifying whether signal interference from a cellular network source is present based on whether a signal from the primary radio altimeter provides an abnormal indication of the first altitude estimate;

in response to identifying that signal interference from a cellular network source is not present, correlating the first altitude estimate with a second altitude estimate of the vehicle detected by an onboard secondary radio altimeter that includes a millimeter wave radar sensor; and in response to identifying that signal interference from a cellular network source is present, detecting a second altitude estimate of the vehicle by the secondary radio altimeter, and processing a signal from the secondary radio altimeter to provide an indication of the second altitude estimate.

14. The method of claim 13, further comprising:

applying a correction factor to the correlated first and second altitude estimates; and processing the correlated first and second altitude estimates to provide an indication of a final altitude estimate.

15. The method of claim 13, further comprising:

sending a final altitude estimate to a display system for the vehicle.

16. The method of claim 13, wherein the millimeter wave radar sensor includes an antenna array operating at a millimeter wave frequency, and is housed in the RF antenna.

17. The method of claim 16, wherein a feed for the antenna array is enabled when the first altitude estimate of the vehicle is not greater than the predetermined threshold altitude.

18. The method of claim 13, wherein:

the primary radio altimeter and the RF antenna operate in a frequency range of about 4.2 GHz to about 4.4 GHz; and the millimeter wave radar sensor is configured to operate in a frequency range of about 76 GHz to about 84 GHz.

19. The method of claim 13, wherein the vehicle comprises an aircraft.

20. The method of claim 13, wherein the cellular network source produces next generation cellular signals including 5G signals.

* * * * *